Sept. 28, 1943.  W. L. BAXTER  2,330,260
METHOD OF MAKING SHOE LASTS
Filed Jan. 24, 1942  2 Sheets-Sheet 1
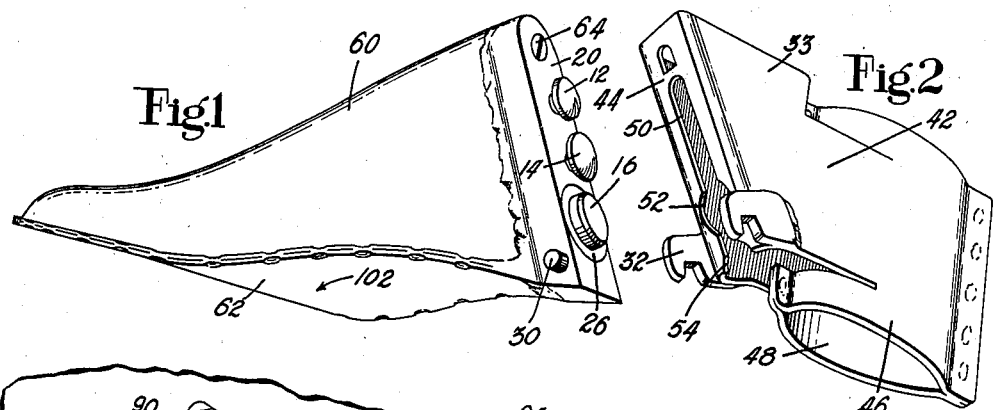
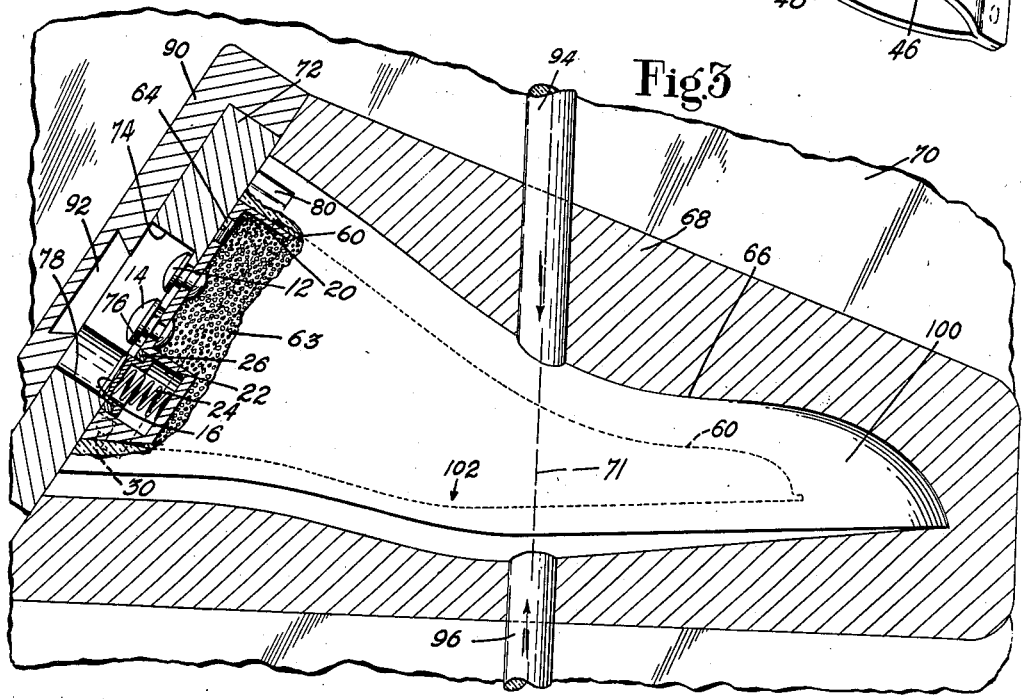
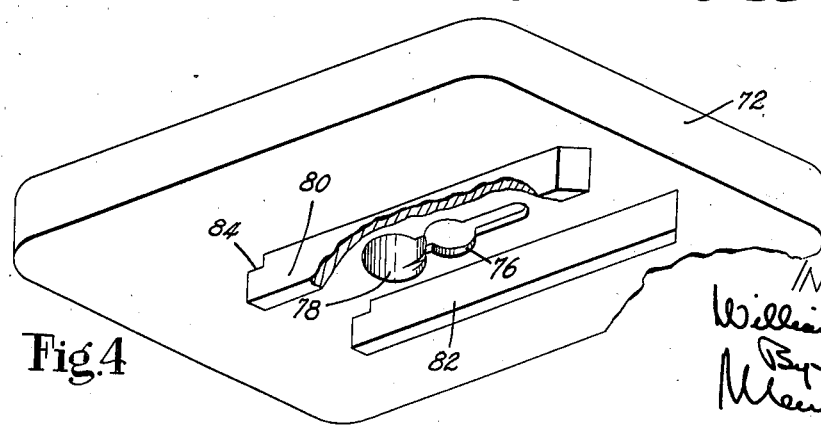
INVENTOR
William L. Baxter Sept. 28, 1943.                    W. L. BAXTER                    2,330,260
                            METHOD OF MAKING SHOE LASTS
                              Filed Jan. 24, 1942                 2 Sheets-Sheet 2
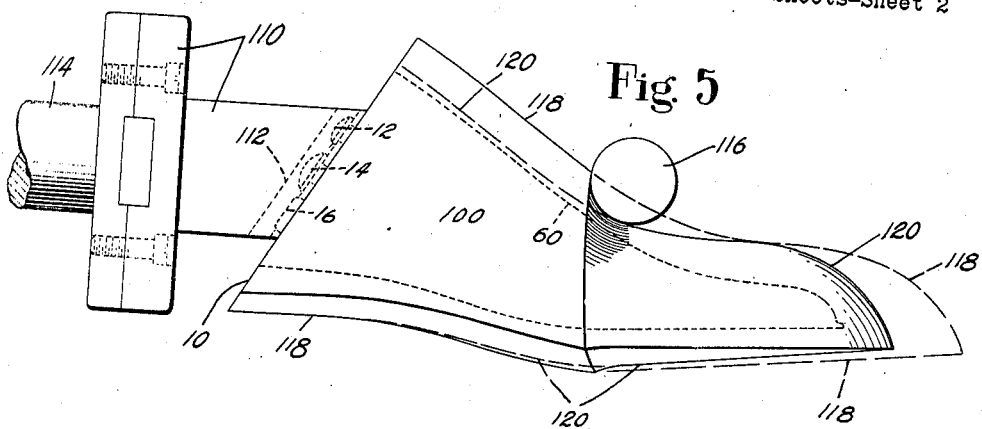
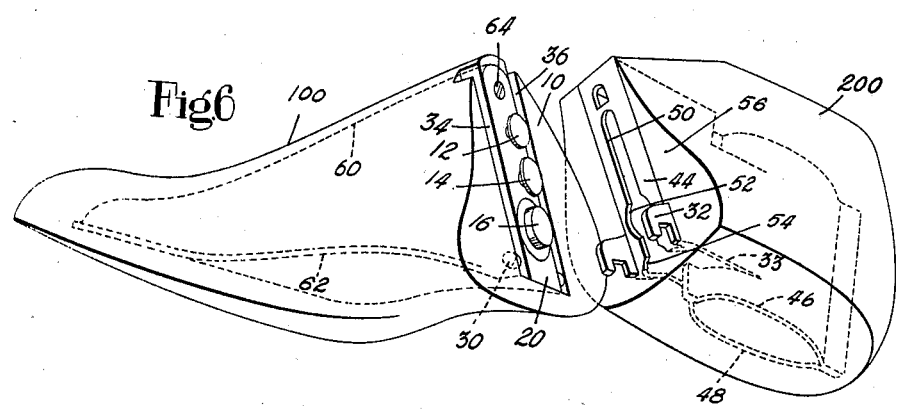
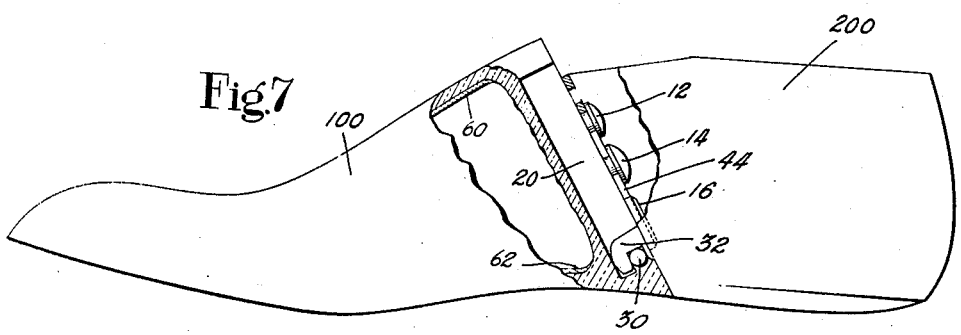
INVENTOR
William L. Baxter
By his attorney Patented Sept. 28, 1943

2,330,260

UNITED STATES PATENT OFFICE 2,330,260

METHOD OF MAKING SHOE LASTS

William L. Baxter, Marblehead, Mass., assignor to United Shoe Machinery Corporation, Flemington, N. J., a corporation of New Jersey Application January 24, 1942, Serial No. 428,043

2 Claims. (Cl. 12—146)

This invention relates to lasts for boots and shoes and is more particularly concerned with a method of making two-part lasts by successive steps including the step of molding.

The ordinary method of making lasts from wooden blocks involves just as much labor for the thousandth last as was utilized in making the second one and, in general, the amount of salvage to be obtained from lasts discarded because they are damaged or out of style is small. For this reason, the use of lasts produced by a process of molding has long been contemplated and desired, partly because of the ease of duplicating the lasts, again because of the obtainable salvage, and partly because of the possibility of obtaining a finished surface on the molded article. No satisfactory answer to this desire has been forthcoming, however, because of the excessive cost of the hollow molds in which the lasts are to be formed. For example, in the making of men's shoes of a particular style, the number of different sizes of lasts and hence the number of molds required for all the different lengths and different widths which are to be manufactured will always be as great as 50 and may readily be 75 or 100. The cost of this number of molds would be prohibitive, and this factor is aggravated by the desire of the manufacturers for varying styles. In addition, a molded last made of the materials employed for molded articles has not usually been satisfactory because of the lack of toughness of the molded materials and their lack of resistance to chipping and shattering. Unless a last has a very considerable strength to withstand the stresses employed in shoemaking machines and can be handled for temporary storage without excessive care, it will not be satisfactory to the shoemaker. This lack of strength continued unsolved until my discovery of a molding compound having the desired characteristics, and this compound is described in United States Letters Patent No. 2,094,868, granted October 5, 1937, upon an application filed in my name.

Accordingly, an important object of the invention is to provide a method of making lasts chiefly by molding which will overcome the difficulties previously experienced. So-called separable lasts in which the heel part is divided from the forepart along an inclined secant plane extending upwardly and forwardly of the last have long been known. In the making of such lasts, connecting devices have been provided which are attached to, or located at, the joint surfaces and render it possible to remove the heel part of the last from the shoe, as by a sliding movement, prior to the removal of the forepart and at the same time provide a rigid connection which enables the last to perform its usual function without accidental separation or relative movement between the two parts, and the method is herein illustratively described as applied to the making of that sort of last.

In one aspect, invention resides in the utilization of specially designed forepart cores made of metal, or the like, and the molding of the foreparts around these cores in a way which permits variation of style or size at the toe portion, where most such changes occur, without need of a new mold for each style or the like. The cores may be made hollow in order to reduce the weight of the last and their use enables a relatively small portion of the moldable material to be employed. This is particularly true of the forepart in which the core comprises a hollow foot-shaped member commonly made of sheet steel and having secured to it at its rear end a plate which carries part of the connecting mechanism. A saving of plastic material is effected, in this process, by coordinating the core and the mold to cause comparatively little material to surround that portion of the core which is rearward of the ball line while applying a greater mass of material around the toe portion, thus permitting the formation of a plurality of selected sizes and styles by reducing this molded piece.

To offset the very serious expense of many molds, I propose the utilization, for the molding step, of only a small number of molds, three, for example, and the subsequent turning to exact shape and size of the molded blanks. It will be realized, however, that the amount of material which must be removed is very much less than in the case of a block of wood since the molding operation has brought the part almost to its final shape and, by reason of the employment of suitable molding materials, such as that described in the patent aforesaid, the tool marks of the turning lathe are so slight that the labor of finishing the last is greatly reduced as compared with a wooden last. Furthermore, the performance of this process is greatly facilitated by reason of the presence of the connecting devices upon the joint-surface ends of the cores around which the molded parts are formed with a joint surface flush with that on the core. Chucks for a last lathe are provided having a connecting part which will coact with that on the last-like blank and will enable the blank to be snapped into position on the chuck of the lathe and immediately subjected to the action of the turning tool, frequently without necessitating a cooperating toe rest.

Details of the steps of the method of making the lasts and of the resulting last construction will best be understood from the following description taken in connection with the accompanying drawings, in which Fig. 1 is an angular view of a core for a forepart of a sliding joint, two-part last, said core being provided with a connecting mechanism;

Fig. 2 is an angular view of a metal core for the heel part of such a last and it is shown as having a cooperating connecting mechanism;

Fig. 3 is a vertical section taken through a mold for the forepart blank of a last and with a core supported in position ready for molding;

Fig. 4 is an angular view of a cover plate for the open end of the mold;

Fig. 5 illustrates the reduction, in a last-lathe, of a previously molded forepart blank;

Fig. 6 is an exploded view of a separable two-part molded last prepared in accordance with the method of the invention and containing the metal cores of Figs. 1 and 2; and Fig. 7 is a view of my two-part last, with the mid-portion partly in section, to show the hooks and projections of the connecting mechanism in engagement.

The last-making process to be described is illustratively shown in connection with the making of a separable, two-part last of the sliding-joint type and having joint surfaces extending from a point near the heel-breast line upwardly and forwardly of the last. To aid in connecting and locking a forepart 100 and a heel part 200 together, the joint surface 10 (Fig. 6) of the forepart of the last is provided with two headed studs 12 and 14 and a spring-pressed locking plunger 16. The studs 12 and 14 are riveted to a box-like metal member 20, shown in section in Fig. 3, and, within this box-like member, is a cylindrical socket 22 formed in a solid end portion of the member 20 for the reception of a spring 24 which holds the plunger outwardly. The latter is prevented from leaving the recess 22 by a ring 26 around the neck of the plunger and having a press fit in the recess. At the sides of the metal box 20 are projecting lugs or studs 30 (Figs. 1 and 7) which coact with hooks 32 upon a metal core 33 for the heel part 200 of the last so as thereby to give the joint between the heel part and the forepart greater strength to resist pressure such as that exerted by the leveling machine when the last is supported only by a last spindle. In the finished last forepart, as illustrated in Fig. 6, grooves 34 and 36 are provided in the joint surface 10, for the admission of the hooks 32 as relative heightwise movement between the two parts of the last is given to lock them together. The heel part of the connecting mechanism, which is generally of the type shown in Letters Patent of the United States No. 2,054,935, granted September 22, 1936, upon the application of John B. Hadaway, is secured to the metal heel core 33. This heel core (Fig. 2) comprises side plates 44 extending rearwardly from a front plate 44 and connected to curved portions 46, 48 which are brought together to make a thimble which is oval in cross section to cooperate with a jack pin of similar shape thereby to enable accurate location of the longitudinal axis of the last in machines for operating upon a shoe carried on the last. The front plate 44 of the heel part core 33 is flush with the joint surface 56 (Fig. 6) of the heel part and has a keyhole slot 50 enlarged at 52 to receive the head of the stud 12 and also at 54 to receive the head of the other stud 14 as the two parts are brought together. The hook portions 32 are welded to the sides 42 of this metal core. The assembling of the two last parts is effected as in other lasts of this type by inserting the studs in the enlargements 52, 54 and then moving the heel part 200 downwardly heightwise of the forepart 100 so that the shanks of the studs 12 and 14 will slide into the narrow portion of the slot 50 and, when the shank of the stud 12 reaches the top of the narrow portion 50, the plunger 16 will snap into the enlargement 52 and lock the two parts against unintentional displacement. During these movements, the hooks 32 will enter the grooves 34 and 36 and, at the completion of the movements, will engage lateral projections such as the studs 30.

A forepart core 60 is formed of sheet metal and one arched portion is welded (Fig. 1) to the box-like member 20 and another partly flat portion 62 substantially parallels the bottom of the completed last and is welded to the top portion. Inasmuch as the pressures involved in molding a plastic around such a core are very considerable, it is found desirable completely to fill the forepart core 60 with a finely divided solid material 63, such as sand or shot, and this is inserted by removing and later replacing a screw plug 64 in the box-like member 20. After the molding operation, the plug 64 may again be removed and the sand or the like poured out so as to lighten the last.

The molding of the last can be carried on in any well-known and desired fashion but, for the sake of description, an open-ended forepart mold recess or cavity 66 is shown as formed in a block 68 (Fig. 3) projecting from the side of a mold piece 70 divided along the line 71. To support the core 60 in the mold cavity, an abutment plate 72 (Figs. 3 and 4) is employed which is recessed at 74 and provided with a double keyhole slot 76, 78 to receive the locking mechanism upon the rear end of the forepart core 60. When this is inserted in place, the plunger 16 will enter the lower enlargement 78 and lock the two parts temporarily together. On this abutment plate 72 are also provided fins 80 and 82 (Fig. 4) to produce, during the molding operation, the grooves 34 and 36 extending inwardly from the joint surface 10 of the forepart of the last. The ends of these fins 80 and 82 are notched at 84 to receive the studs 30 and their other ends are inclined to correspond with the slope of the sides of the mold recess. After the core 60 and the abutment plate 72 have been assembled, the assemblage is mounted in the open-sided recess of a cover 90, the latter being provided with a dovetail slot to receive a dovetail projection 92 upon the outer face of the abutment plate 72. Other coacting parts (not shown) of the mold are then brought into position and the whole clamped tightly together to permit the injection, under pressure, through suitable passages 94 and 96, of a molten thermoplastic resinous material such as that described in the aforementioned Patent No. 2,094,868. A similar mold and a similar process are employed for making the heel-part blank 200 of the last about the metal core 33 with the plate portion 44 flush with the secant joint surface 56 and the hooks 32 projecting from that face.

The design of the core of the forepart 60 and the coacting mold cavity 66 is such that, in the molded blank, comparatively little plastic material surrounds that portion of the core which is to the rear of the ball line 102 (Figs. 1 and 3), while the mold cavity 66 permits a more considerable portion of plastic material to be molded around the toe part of the last. The purpose of this is to permit a greater number of styles to be formed with the same mold and upon the same core, it being well understood that changes in styles of lasts occur principally forward of the ball line. It will be understood, furthermore, that the size of the mold cavity 66 is such as to permit a substantial number of sizes or styles of foreparts to be constructed from forepart blanks made in the same mold and around forepart cores of the same size.

After the material has solidified and the forepart blank 100 of the last has been removed from the mold, then, by utilizing the connecting mechanism upon the box-like member 20, this forepart blank can be locked upon a specially constructed chuck 110 (Fig. 5) having a recess 112 and openings corresponding substantially to those shown in the abutment plate 72 in Fig. 4. The blank is thereby positioned in the lathe by engagement with said mechanism. The last lathe for this purpose may be of any desired construction and will involve a driven spindle 114 without a toe rest, since it usually will be unnecessary to employ a toe rest in view of the rigid manner in which the connecting mechanism secures the forepart blank to the chuck 110. One suitable lathe construction is illustrated in Letters Patent of the United States No. 1,713,792, granted May 21, 1929, upon the application of L. E. Topham. The arrangement shown diagrammatically in Fig. 5 involves a suitable driven cutter 116 to reduce the forepart blank from the outline shown at 118 to the final contour shown at 120. By proper design of the mold, only a moderate amount of thermoplastic resinous material needs to be removed by the cutter 116 so that the last parts can be produced from the molded blanks at a much higher rate of speed than is possible when cutting them from wooden blocks where a large amount of material must be removed. It will be recalled, furthermore, that the chips of the thermoplastic resinous material are reclaimable and can be remelted and utilized in subsequent molding operations. The surface produced in the last lathe when cutting this moldable material is furthermore so nearly smooth that a minimum of finishing operations are required. The lack of grain in the moldable material is probably at least partly responsible for this result.

Having thus described my invention, what I claim as new and desire to secure by Letters Patent of the United States is:

1. That method of making a part of a separable last having at one end a joint surface and a connecting mechanism projecting therefrom, which consists in placing in a mold cavity larger than the desired product a core having a joint surface and a connecting mechanism permanently secured thereto and projecting therefrom, casting a moldable material about said core with a finished joint surface flush with the joint surface of the core, thus leaving the connecting mechanism exposed, positioning said molded part in a lathe chuck by engagement with said mechanism, and then reducing to the desired dimensions only that molded portion of the last part which extends beyond the joint surface.

2. The method of making a hollow moldable last part which may be reduced to any one of several selected sizes and styles which consists in molding a hollow last part having comparatively little material surrounding that portion of the core that is rearwardly of the ball line and a greater mass of material around the toe portion of the last part whereby said last part contains sufficient material to form a plurality of selected sizes and styles, and then reducing the molded last part to the desired size.

WILLIAM L. BAXTER.